June 13, 1950 W. M. SHIBLES 2,511,548
SPEED CHANGING MECHANISM
Filed June 26, 1946 2 Sheets-Sheet 1

INVENTOR
William M. Shibles
BY James E. Sproll
ATTORNEY.

June 13, 1950 W. M. SHIBLES 2,511,548
SPEED CHANGING MECHANISM
Filed June 26, 1946 2 Sheets-Sheet 2
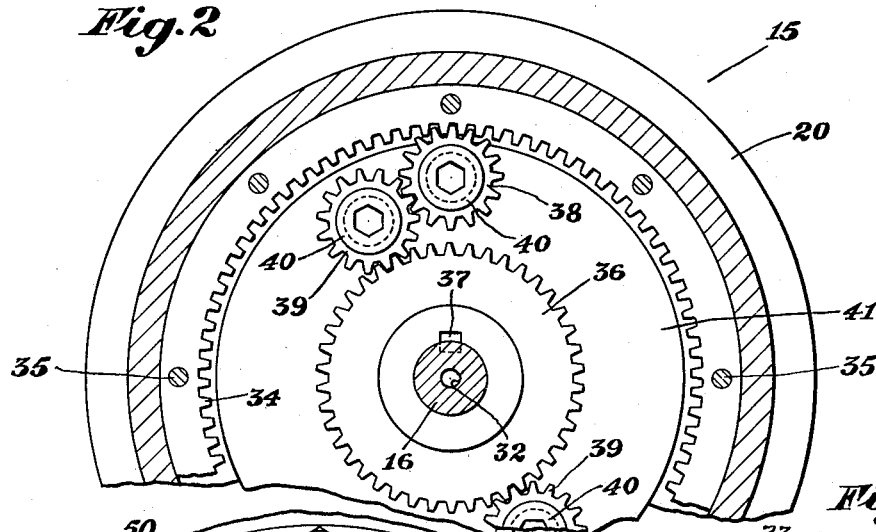
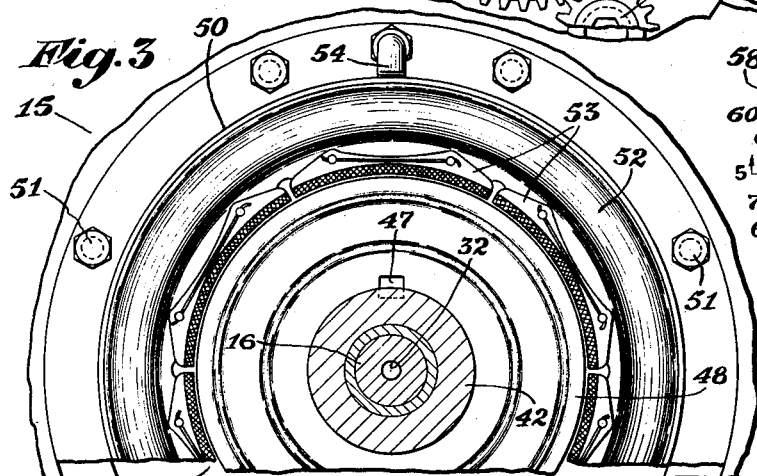
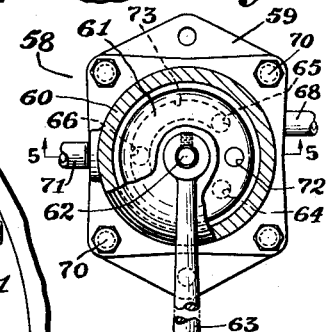
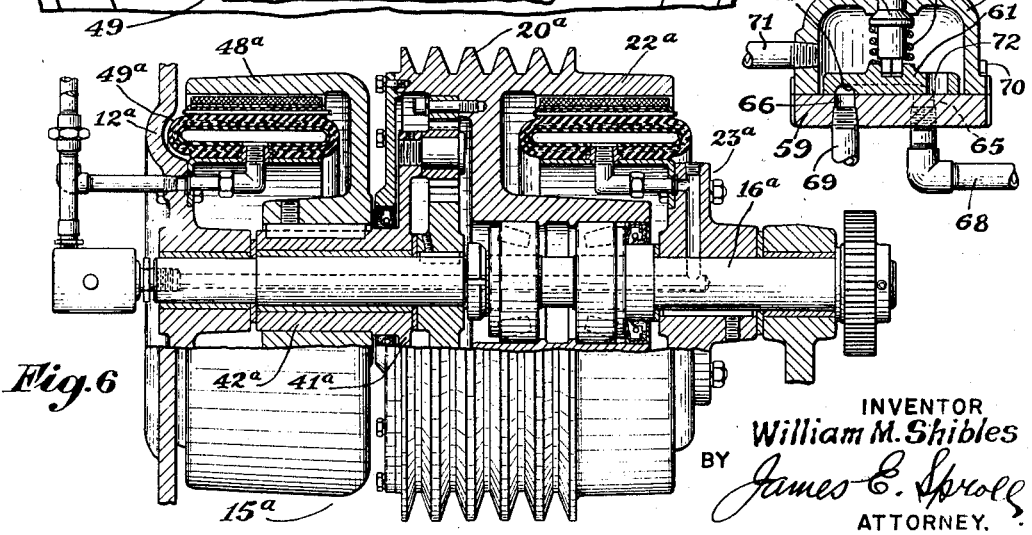
INVENTOR
William M. Shibles
BY James E. Sproll
ATTORNEY.

Patented June 13, 1950

2,511,548

UNITED STATES PATENT OFFICE 2,511,548

SPEED CHANGING MECHANISM

William M. Shibles, Seattle, Wash.

Application June 26, 1946, Serial No. 679,372

1 Claim. (Cl. 74—789)

This invention relates to improvements in speed-changing mechanisms and aims primarily to provide a speed-changing mechanism especially designed and particularly adapted for incorporation and use with the drives of machine tools; such as: lathes, boring mills, drill presses, milling machines, gear cutting machines, broaching machines, shapers, planers, or the like, to thereby double the number of cutting speeds of said machine tools, and which may also be employed with power drives and/or transmissions, other than machine tool drives, for materially improving and enhancing the efficiency of the same.

Further objects of the invention are to provide a speed-changing mechanism having the following novel and important features: a mechanism capable of either high or low speed operation; a mechanism by or with which change of speed under full load may be effected without loss of speed or inertia of the driven member; a mechanism having a positive neutral position; a mechanism having a smooth and cushioned action during speed-changing periods; a mechanism having non-shifting torque transmission elements or members and hence does not require any extraneous locking device or devices for holding said elements or members in the selected speed-changed position; a mechanism adaptable and capable of local or remote control; a mechanism adaptable and capable of being reversed from full speed in one direction to full speed in the opposite direction by reversing the power driving unit of the same; and a mechanism which may be partially disengaged from the load at one speed, while partially engaging the same at another speed.

With the foregoing in view, the invention essentially resides and is more particularly concerned in the provision of a speed-changing mechanism, which in its preferred embodiment is characterized by the employment of a single driving member, such as a pulley or gear; a single driven member, such as a countershaft, revoluble within the driving member; a rotary torque transmitting structure or clutch mounted upon and rotatable with said driven member, whereby the latter is interlocked with the driving member for rotation as a unit, for a 1:1 speed ratio; planetary or epicylic gearing including a non-rotatable brake structure, wherethrough torque is transmitted from the driving member to the driven member for a 2:1 speed ratio; and control means, which may be located in close proximity to the speed-changing mechanism or remotely therefrom, for selectively imparting the desired speed to the driven member.

The above, and additional objects which will hereinafter be more specifically treated are attained by such means as are shown in the accompanying drawings; described in the following specification, and then more clearly pointed out in the claim, which is appended hereto and forms part of this application.

With reference to the drawings, in which there are illustrated two embodiments of the invention, and throughout the several views of which like characters of reference designate similar parts:

Figure 2 is a fragmentary transverse vertical section of the same taken on the line 2—2 of Fig. 1;

Figure 3 is a similar section taken on the line 3—3 of Fig. 1;

Figure 4 is a plan view of the four-way fluid pressure control valve, which is employed for selectively obtaining the desired speed from the speed-changing mechanism, certain parts of same being broken away and shown in section for clarity of illustration;

Figure 5 is a transverse vertical medial section of the valve taken on the line 5—5 of Fig. 4; and Figure 6 is a view, partly in longitudinal vertical medial section and partly in side elevation of an alternative form of speed-changing mechanism.

Figure 1:
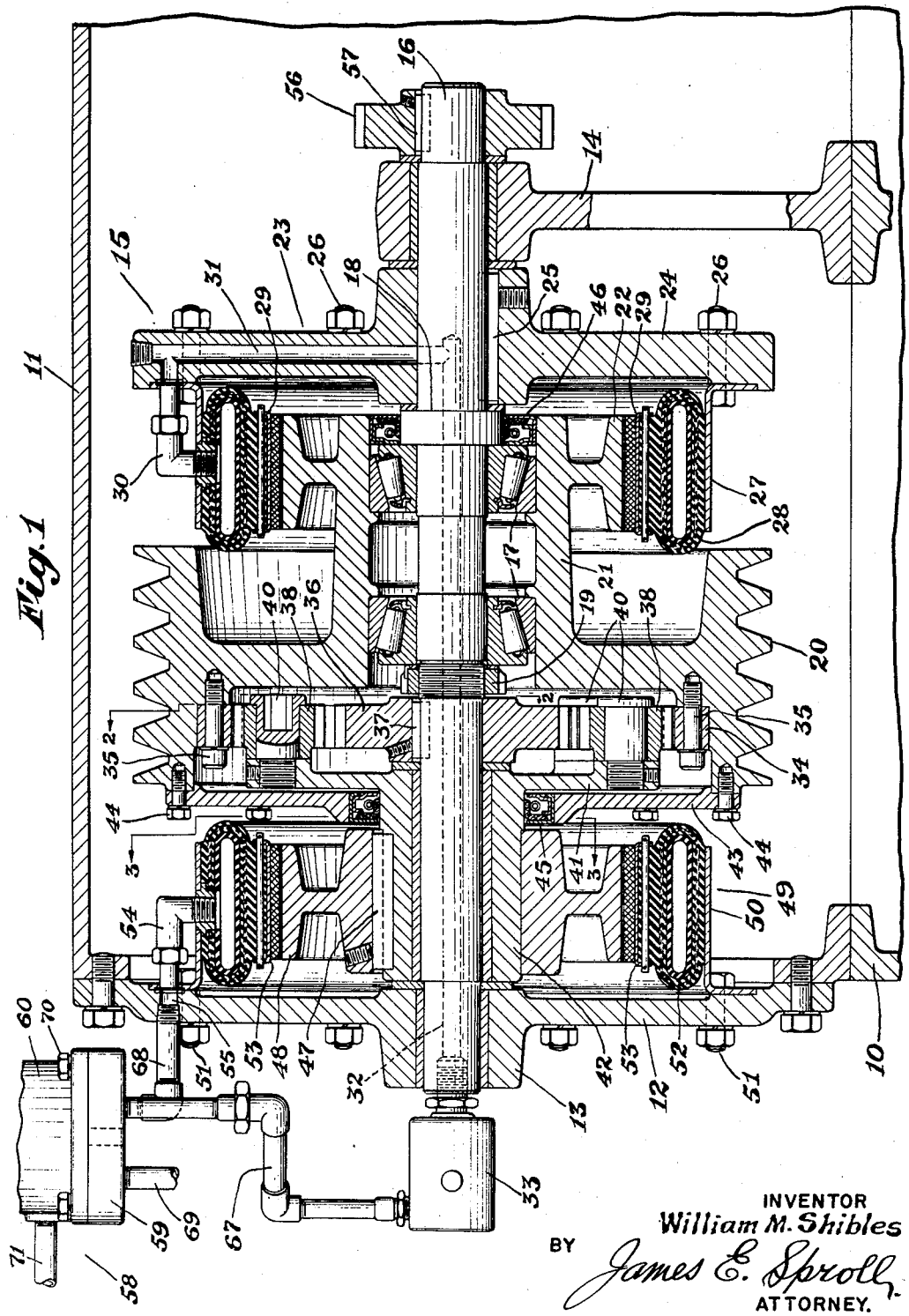
Figure 1 is a longitudinal vertical medial section of a speed-changing mechanism comprehended by the present invention, and as it would appear when operatively installed within a lathe headstock housing.

In the present disclosure, I have elected to show and describe the speed-changing mechanism of the invention as operatively adapted for use with a lathe headstock change gear transmission, whereby the cutting speeds of the lathe work spindle are doubled; however, it is to be here understood that this is for purposes of illustration only, inasmuch as the present speed-changing mechanism has many adaptations and applications.

In Figure 1 the numeral 10 designates the headstock end of the bed or base of a lathe; 11, the headstock casing housing the lathe change gear transmission, not shown; 12, a demountable end cover plate for the headstock casing having a central bushed boss 13 formed thereon; and, 14, a demountable bushed bracket fixedly secured to the lathe bed 10 in axially aligned spaced relation to the bushed boss 13.

The numeral 15 generally designates the speed-changing mechanism of the present invention, the driven member or countershaft 16 of which is journalled at its ends within the bushed boss 13 and bushed bracket 14, respectively. Mounted in opposed spaced relation upon the countershaft 16, at a point substantially midway the length thereof, are anti-friction or tapered roller bearings 17, which are maintained and retained against outward axial displacement thereon by an integral shaft collar 18 and a shaft locknut 19.

The driving member of the speed-changing mechanism 15, which in the present disclosure is illustrated as in the form of a V-belt 20, is connected by appropriate V-belts to a suitable power unit, not shown, and is journalled or revolubly mounted upon the anti-friction bearings 17, said pulley, for this purpose, being provided upon one end thereof with an integral, interiorly shouldered and concentrically disposed sleeve 21, wherein the bearings 17 are housed and retained against inward axial displacement by the shoulders thereof. Integrally formed upon, or otherwise fixedly secured to, the periphery of the sleeve 21 at the outer end thereof, is a friction wheel 22 adapted for frictional engagement with a fluid-distensible torque transmitting and cushioning rotary structure or clutch 23, of the constricting type.

The type of torque transmitting and cushioning rotary structure herein shown is well known in the industrial art, hence, no claim for novelty in such structure, per se, is made herein, except, and however, it is thought and believed that the combinations of such structure, or its mechanical equivalent, with the other elements or features of the present invention, are new and novel. The rotary structure 23 herein disclosed comprises a centrally bossed disk-shaped member 24, which is rigidly secured to the countershaft 16 for rotation therewith, as by a key 25, said member 24 for this purpose being interposed between the bushed bracket 14 and the integral shaft collar 18, as shown in Fig. 1. Fixedly secured, as by bolts 26, to the inner face of the member 24 is an inwardly directed annular flange 27 adapted to be normally disposed in a common plane with and in concentric spaced relation to the friction wheel 22, said annular flange 27 having the annular fluid-distensible and constricting member 28 of the structure 23 fixedly secured to its inner wall surface, which member 28 upon its constricting wall surface is provided with a series of friction shoes 29 for frictionally engaging the periphery of the friction wheel 22 upon distention and constriction of the member 28. Fluid pressure is supplied to the distensible member 28 by an L-shaped fitting 30, which communicates with a radially disposed passageway or duct 31 formed within the disk-shaped member 24, said passageway 31 at its inner end having communication with an axial bore 32 formed within the countershaft 16 and extending to the outer end thereof, whereat a rotorseal 33 is threadedly mounted, which latter is also well known in the industrial art, inasmuch as it is supplied when necessary by the manufacturer of the rotary structure 23. Briefly the rotorseal 33 consists of a ground and lapped spindle rotating in a sealed double row ball bearing and is positively sealed within its correlated casing by a non-metallic bushing.

Enclosed within the V-belt pulley 20, on the chambered or opposite end of same to that of the integral sleeve 21, is planetary or epicyclic gearing consisting of an annular or ring gear 34 detachably secured to the pulley 20, as by cap screws 35; a sun gear 36 fixedly secured to the countershaft 16 by a key 37; and diametrically opposed sets of intermeshing planet pinions, one pinion 38 of each set meshing with the annular gear 34, while the other pinion 39 of each set meshes with the sun gear 36, as more clearly shown in Fig. 2, the purpose and function of the double planet pinions being to always drive the countershaft 16 in the same direction as the driving member 20. The planet pinions 38 and 39 are revolubly mounted upon studs 40, which latter are threadedly secured in spaced relation within the marginal portion of a disk-shaped planet carrying member 41 having upon one side thereof an integral concentrically disposed and exteriorly shouldered bushed sleeve portion 42, which is revolubly mounted upon the countershaft 16, between the bushed boss 13 and the sun gear 36. The numeral 43 indicates an annular cover plate for the planetary gear chamber of the drive pulley 20, which is detachably secured to the end of the latter in concentric relation to the sleeve portion 42, as by cap screws 44. The antifriction bearings 17 and the planetary gearing above described are adapted to run in oil or grease, accordingly, the cover plate 43 is provided with an oil seal 45 and the outer end of the pulley sleeve 21 is similarly provided with an oil seal 46.

Fixedly secured by a key 47 to the sleeve portion 42 of the planet carrying member 41 is a brake or locking wheel 48 adapted to be frictionally engaged by a non-rotatable fluid-distensible cushioning brake or locking structure 49, of the constricting type, said structure having an annular flange member 50, adapted to be detachably secured, as by bolts 51, to the inner face of the end cover plate 12 of the headstock casing 11 and to be normally disposed in a common plane with and in concentric spaced relation to the brake wheel 48, said annular flange member 50 having the annular fluid-distensible and constricting member 52 of the brake structure 49 rigidly secured to its inner wall surface, which member 52 upon its constricting wall is provided with a series of brake or friction shoes 53 for frictionally engaging the periphery of the brake wheel 48 upon distention and constriction of the member 52. Fluid pressure is supplied to the distensible member 52 by an L-shaped fitting 54, the outer end of which is seated within the annular flange member 50 for communication with an opening or port 55 formed within the end cover plate 12 of the headstock casing 11, and is suitably sealed thereat against leakage to the atmosphere.

The countershaft 16 may be operatively connected to the lathe change gear transmission, not shown, in any desired or suitable manner, however, in the present instance, for effecting such a connection, I have provided the inner terminal portion of said countershaft projecting from the bushed bracket 14 with a spur gear 56, which is fixedly secured thereto, as by a key 57.

To effect selective operation of the torque transmitting structure 23 and/or the brake structure 49, I have provided, as shown in Figs. 4 and 5, a four-way fluid pressure control valve 58 for the speed-changing mechanism 15, said valve consisting of a base plate 59, a valve bonnet 60, a valve disk 61, a valve stem 62, and a valve operating handle 63. The base plate 59 is provided with a pair of inlet-outlet ports 64 and 65, respectively, also an exhaust port 66, said inlet-outlet port 64 being connected by piping 67 to the inlet of the rotorseal 33 for furnishing fluid pressure to the torque transmitting structure 23 and exhausting the same therefrom, while the inlet-outlet port 65 is connected by piping 68 to the opening or port 55 in the end cover plate 12 for furnishing fluid pressure to the brake structure 49 and exhausting the same therefrom. The exhaust port 66 is provided with an exhaust pipe 69, whereby the exhaust fluid pressure is carried off and dissipated at any suitable or desirable point. The valve bonnet 60 is fixedly secured, as by cap screws 70, to the upper face of the base plate 59, and is connected by a fluid pressure supply pipe 71 to a source of fluid pressure, not shown. The valve disk 61 is adapted to normally seat upon the upper face of the base plate 59 and is provided in its marginal portion with a fluid pressure inlet port 72 and also within its valve abutting face with a substantially semi-circular groove 73, which latter functions to establish and maintain communication between the inlet-outlet ports 64 and 65 and the exhaust port 66 when the valve disk 61 is in its neutral or central position, also to maintain such communication between the inactive inlet-outlet port and the exhaust port, when the fluid pressure inlet port of said valve disk is in registration with the active inlet-outlet port. The valve stem 62 at its lower squared terminal is concentrically seated within the upper face of the valve disk 61, for effecting oscillative movement of the latter, and also at a point, substantially midway, its length is provided with a frustro-conical collar 74 seatable within the valve bonnet 60 thereby eliminating the usual valve stem stuffing box. A helical spring 75 interposed between the valve disk 61 and the collar 74 functions jointly to maintain the said disk in seated relation upon the base plate 59 and said collar in similar relation within the valve bonnet 60. Stops, not shown, may be provided to positively limit oscillative movement of the valve disk 61 and thus assure of proper registration of the fluid pressure inlet port 72 with the inlet-outlet ports 64 and 65 during operative periods of the speed-changing mechanism.

In the operation of the speed-changing mechanism 15, assuming a direct drive or 1:1 ratio is desired, the operator moves the valve operating handle 63 toward the left in Fig. 4, thereby admitting fluid pressure to the fluid-distensible member 28, to cause constriction of the inner wall of the same and in consequence frictional engagement of the friction shoes 29 with the periphery of the friction wheel 22, and thus establish a direct drive between the latter and the countershaft 16, as will be manifest and apparent. When it is desired to increase or double the speed of the countershaft 16, the operator moves the valve operating handle 63 to a corresponding position on the right of center, thereby exhausting fluid pressure from the distensible member 28 and admitting fluid pressure to the distensible member 52, to cause constriction of the inner wall of same and in consequence frictional engagement of the brake shoes 53 with the periphery of the brake wheel 48, thus locking the planet carrying disk 41 against rotation, whereupon torque is transmitted from the driving member or pulley 20 to the countershaft 16 through the ring gear 34, planets 38 and 39 and sun gear 36. To return the speed-changing mechanism to its inactive or neutral position, the operator moves the valve operating handle 63 to its central position shown in Fig. 4, thereby exhausting the fluid pressure from the distensible member 52.

In the alternative form of speed-changing mechanism shown in Fig. 6, and therein generally designated by the numeral 15a, the essential difference between this mechanism and the speed-changing mechanism 15 hereinbefore shown and described, is that the expanding type of torque transmitting and cushioning rotary structure and brake structure has been substituted for the constricting type of torque transmitting and cushioning rotary structure 23 and brake structure 49 of said mechanism 15, hence, for the sake of brevity, it is thought and deemed necessary to describe only those changes or modifications of structure necessitated by such substitutions or replacements, as the remaining elements or parts are identical to those hereinbefore shown and described for the mechanism 15.

Accordingly, the driving member or V-belt pulley 20a of the mechanism 15a is provided upon its direct drive end, with an integral annular flange or peripheral drum 22a, which flange extends from the pulley in axial prolongation thereto for frictional engagement with a fluid-distensible torque transmitting and cushioning rotary structure or clutch 23a, of the expanding type, which structure is operatively positioned upon and rigidly connected to the countershaft 16a of the mechanism 15a in substantially the same manner as hereinbefore described for the structure 23 of the mechanism 15.

As a substitute for the brake wheel 48 of the mechanism 15, a brake drum 48a is provided which is keyed to the sleeve extension 42a of the disk-shaped planet carrying member 41a, said brake drum being adapted for frictional engagement by a non-rotatable fluid-distensible cushioning brake structure 49a, of the expanding type, which structure is detachably secured to the inner face of the end cover plate 12a of its correlated headstock casing, not shown, in substantially the same manner as hereinbefore described for the brake structure 49 of the mechanism 15.

In the operation of the alternative form of speed-changing mechanism 15a, fluid distention of the torque transmitting rotary structure 23a functions to directly connect the driving pulley 20a with the countershaft 16a, for a 1:1 speed ratio, while similar distention of the brake structure 49a functions to transmit torque from the pulley 20a through the planetary gearing of the mechanism to the countershaft 16a, for a 2:1 speed ratio.

In both forms of speed-changing mechanisms herein disclosed the driving and driven members rotate in the same direction at all speeds and reversal of the driven members can only be effected by reversing rotation of the correlated power units thereof.

Exhaustive tests of the present speed-changing mechanism and extensive practical use of same in various types of machine tools have shown and demonstrated that such mechanism, by reason of its novel and improved construction, is especially adapted and suited for high operational speeds; permits of speed changes, under full load, without loss of speed or inertia of the driven member; provides smooth and cushioned action during speed changing periods; also, while having a positive neutral or inactive completely disengaged position, as shown in Figs. 1 and 6, permits, when desired, by proper manipulation of the control valve 58, of gradual or partial disengagement from the load at one speed and gradual or partial engagement at another speed, or of instant transferral of the load from one speed to another; and since, in its preferred embodiment, such mechanism is operable by fluid pressure, it may be activated and controlled from any desired distance or remote point.

In the present disclosure, the driving members 20 and 20a of the speed-changing mechanisms 15 and 15a have been herein shown and described, as in the form of V-belt pulleys, but, it should be here understood, that this is for purposes of illustration only, inasmuch as such driving members may be in the form of gears, sprocket wheels, or the like. It should also be noted, in this connection, that all speed changes or variations are accomplished by a single pulley and a single shaft.

It should also be understood that the fluid-distensible torque transmitting rotary structures 23 and 23ª and the rotatable brake structures 49 and 49ª may be either pneumatically or hydraulically distended, as found expedient.

The speed-changing mechanism of the invention having no shiftable elements or members does not require arms, levers, springs, or toggles for effecting changes of speed or for holding the torque transmitting elements in driving or operating relation, hence, such mechanism is extremely compact in form for snugly fitting within machine tool change gear transmission casings, or the like.

Manifestly, therefore, the speed-changing mechanism of the invention is comparatively simple in construction and operation; is easy to install; is positive and efficient in use; will not readily get out of order; and does not require, per se, any special skill or qualification on the part of the operator of the same.

While I have herein shown and described the invention with sufficient detail to enable those skilled in the art to understand the mode of construction and the principles involved, it is to be understood that there is no intentional limitation herein to the specific forms and precise details of construction of the invention shown and described, except as expressly defined by the appended claim, and it is to be further understood that various changes and modifications of such construction may be resorted to without departing from the spirit of the invention, or the benefits derivable therefrom.

What I claim as my invention, and desire to secure by Letters Patent, is:

In a speed-changing mechanism, the combination of a driving pulley having a concentric sleeve extension and friction wheel on one end and a concentric gear chamber on the opposite end thereof; anti-friction bearings concentrically mounted in spaced relation within said gear extension; a countershaft revoluble within and extending through said bearings; a fluid-distensible torque transmitting rotary structure concentrically mounted upon and rotatable with said countershaft, adapted upon distention to engage said friction wheel, whereby said pulley and countershaft rotate as a unit; a ring gear concentrically disposed within said gear chamber; means for detachably securing said ring gear to the pulley; a sun gear fixedly secured to the countershaft within the gear chamber; a disk-shaped member rotatable within the gear chamber and having an outwardly extending concentric sleeve revolubly mounted upon the countershaft; diametrically opposed pairs of intermeshing planet pinions revolubly mounted upon the inner face of the disk-shaped member, one pinion of each pair meshing with the ring gear and the other pinion of said pair meshing with the sun gear; an annular gear chamber cover; means for detachably securing said cover to the pulley; a brake wheel fixedly secured to said last mentioned concentric sleeve; a non-rotatable fluid-distensible brake structure, adapted upon distention to engage said brake wheel for locking said disk-shaped member against rotation; means for conducting pressure fluid to said torque transmitting and brake structures; and a four-way pressure fluid control valve interposed in said conducting means for selectively activating said structures from any desired point.

WILLIAM M. SHIBLES.

REFERENCES CITED

The following references are of record in the file of this patent:

UNITED STATES PATENTS

| Number | Name | Date |
|---|---|---|
| 971,756 | Jones | Oct. 4, 1910 |
| 1,098,403 | Reck | June 3, 1914 |
| 1,835,153 | Greve | Dec. 8, 1931 |
| 2,035,054 | Durig | Mar. 24, 1936 |
| 2,087,261 | Miller | July 20, 1937 |
| 2,361,357 | Schmitter | Oct. 24, 1944 |
| 2,371,828 | Kuhns et al. | Mar. 20, 1945 |